United States Patent Office 3,407,246
Patented Oct. 22, 1968

3,407,246
MASS POLYMERIZATION PROCESS IN THE PRESENCE OF POLYHYDRIC ALCOHOL MONOESTERS
Alva F. Harris, Wilbraham, Mass., assignor to Monsanto Company, St. Louis, Mo., a corporation of Delaware
No Drawing. Filed Nov. 12, 1965, Ser. No. 507,527
13 Claims. (Cl. 260—880)

ABSTRACT OF THE DISCLOSURE

There is disclosed a mass polymerization process for monovinylidene aromatic hydrocarbons wherein there is incorporated in the polymerizable mixture a polyhydric alcohol monoester of an aliphatic monocarboxylic acid after which the mixture is heated to produce polymerization of the monomers and thereafter the polymerized formulation is separated from the reaction vessel, the monoester being useful in facilitating the separation of the polymer from the reaction vessel.

---

The present invention relates to a novel process for the mass polymerization of styrene-type monomers.

It is well known that styrene-type monomers can be mass polymerized thermally or catalytically to prepare polymers having molecular weights and residual monomer contents which vary with certain reaction parameters; e.g., the catalyst concentration, the time and temperature of the reaction, etc. It is also known that the product of the mass polymerization process may have an undesirably high residual monomer content when the parameters of the process are controlled so as to prepare a molding-grade polystyrene; i.e., a polystyrene having a Staudinger average molecular weight in the range of 40,000 to 100,000.

As shown in the United States Patent No. 2,675,362, certain catalysts make it possible to use a mass polymerization process to prepare molding-grade polystyrene having a residual monomer content as low as 0.35 to 0.5 percent and the product has improved physical and molding properties because of the reduction in residual monomer content. Accordingly, it has been considered desirable to find and employ a catalyst capable of reducing the residual monomer content to even lower levels without otherwise causing degradation of the product because of the advantages which might be obtained thereby. Accordingly, it has been suggested to employ a catalyst system containing an organoperoxysilane in United States application for Letters Patent Serial No. 385,061, filed July 24, 1964, and entitled Polymerization Process, granted on Jan. 10, 1967 as U.S. Patent No. 3,297,669.

In one type of mass polymerization process, the monomers are initially polymerized in a kettle or reaction vessel over a relatively low temperature range on the order of 125 to 75° centigrade to a conversion on the order of about 15.0 to 45.0 percent. Thereafter, the partially polymerized mass is transferred to a platen and frame-type press wherein the temperature thereof is gradually raised to about 180 to 200° centigrade over a period of three to seven hours, and is finally heated at about 180 to 200° centigrade for about one to five hours to complete the reaction. After polymerization has been completed, the polymer is cooled to about 30 to 70° centigrade, and the platens are removed and the cakes of polymer extracted from the frames. Exemplary of such presses are those disclosed in United States Patent No. 2,067,580, granted Jan. 12, 1937, to Otto Rohm; and United States Patent No. 3,140,917, granted July 14, 1964, to Max Klein.

It is an object of the present invention to provide a novel process for mass polymerizing styrene-type monomers wherein a platen and frame-type press is utilized and wherein separation of the polymerized mass from the platen and frames of the press is facilitated and maintenance of the press is reduced.

Another object is to provide a novel mass polymerization process utilizing an organoperoxysilane catalyst to provide a polymer with low residual monomer content.

Other objects and advantages will be readily apparent from the following detailed specification and claims.

It has now been found that the foregoing and related objects can be readily attained in a process wherein a monovinylidene aromatic monomer selected from the group consisting of a monovinylidene aromatic hydrocarbon and a halo monovinylidene aromatic hydrocarbon and mixture thereof is admixed with 0.05 to 1.0 percent by weight, based upon the total weight of the admixture, carboxylic acid, and the monomer is thereafter polymerized, in mass, by heat and a catalyst. In accordance with one aspect of the process, the admixture is initially partially polymerized at a temperature of about 75 to 125° centigrade to effect conversion of about 15.0 to 45.0 percent of the monomer. This initially partially polymerized admixture is then transferred to a platen and frame-type press wherein it is subjected to increasing temperature and gradually raised to about 180 to 200° centigrade, after which it is maintained at a temperature of about 180 to 200° centigrade to effect substantially complete conversion of the monomer. The polymerization product is then cooled to a temperature of 20 to 70° centigrade while in the press, and the press is then opened. The platens are removed, and the cakes of polymerization product are extracted from the individual frames of the press.

In accordance with the preferred aspect to the present invention, the catalyst employed is an organoperoxysilane having a half life of about 220 to 30,000 hours in benzene at 100° centigrade, and the admixture is initially heated at 75 to 125° centigrade until 15.0 to 45.0 percent conversion to polymer is obtained, the temperature being so regulated as to be in the 75 to 95° centigrade range when this conversion is obtained. Thereafter, the reaction temperature of the admixture is gradually raised to 180 to 200° centigrade over a period of about three to seven hours and maintained at 180 to 200° centigrade for about one-half to five hours to effect substantially complete conversion of the monomer.

Polyhydric alcohol monoesters of aliphatic monocarboxylic acids

The polyhydric alcohol monoesters of aliphatic monocarboxylic acids have a structural formula as follows:

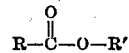

wherein R is an aliphatic group containing eleven to twenty-five carbon atoms and R' is an esterified polyhydric alcohol selected from the group consisting of (A) polyhydric alkyl compounds having two to six carbon atoms such as ethylene glycol, propylene glycol, glycerol and sorbitol, (B) polyalkylene oxide condensates of the formula:

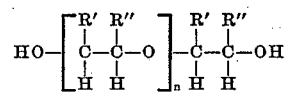

wherein R' and R" are hydrogen, methyl or ethyl groups and provide together not more than two carbon atoms to form a chain of two to four carbon atoms and $n$ is 4 to 75, and (C) polyalkylene oxide condensates of polyhydric alkyl compounds having two to six carbon atoms such as propylene glycol, glycerol and sorbitol wherein the condensate is as set forth in (B) above.

Exemplary of the various compounds which may be used in accordance with the present invention are ethylene glycol monostearate, propylene glycol monolaurate, glyceryl monooleate, polyethylene glycol monostearate, polypropylene glycol monolaurate, polyoxyethylene monosterate, sorbitan monolaurate, sorbitan monostearate, polyoxyethylene sorbitan monostearate, polyoxypropylene sorbitan monostearate, etc.

The preferred compounds are the acid monoesters of polyhydric alkyl compounds having a chain length of two to four carbon atoms, preferably wherein the monocarboxylic acid contains fourteen to twenty carbon atoms in the chain. Exemplary of such alcohols are glycerol, ethylene glycol and propylene glycol, and exemplary of the preferred acids are stearic, oleic, palmitic, linoleic and licanic.

It will be appreciated that the monoester which has as the polyhydric alcohol a polyalkylene oxide condensate can be prepared either by direct condensation of the polyalkylene oxide in the presence of the carboxylic acid or by formation of a polymeric glycol from the alkylene oxide and subsequent esterification of the acid. Compounds of this species produced by the latter process wherein the glycol is first produced and then reacted with the acid exhibiting greater reactivity with the preferred organoperoxysilane catalyst so that the preferred compounds of this species are those wherein the alkylene oxide is condensed in the presence of the carboxylic acid. It is believed that this variation in reactivity with the organoperoxysilane catalyst may be occasioned by impurities resulting from the process conditions.

Sorbitol is generally reacted through the use of the anhydride or inner ether. Sorbitan monoesters and alkoxylated sorbitan monoesters have both been found to exhibit a higher degree of reactivity with the preferred organoperoxysilane catalyst than other polyhydric alcohol monoesters so that they are less preferable for use with this particular catalyst system.

Although this component may be added in the amount of 0.05 to 1.0 percent by weight of the monomer admixture with beneficial effect, it is preferably employed in the range of 0.1 to 0.4 percent by weight due to considerations of optimum efficiency, ease of handling and economics. Generally, the component is readily admixed directly with the monomer, although it may be added as a solution or dispersion in another component if so desired to minimize separate additions.

Monomers

The present invention is applicable to the polymerization of polymerizable monomers comprising a monovinylidene aromatic hydrocarbon and/or an ar-halo monovinylidene aromatic hydrocarbon, e.g., styrene; vinyl naphthalene; ar-alkylstyrenes, such as o-, m- and p-methylstyrenes, ar-ethylstyrenes, p-tert-butylstyrene, etc.; ar-halostyrenes, such as o-chlorostyrene, p-bromostyrene, 2-chloro-4-methylstyrene, etc.; and mixtures thereof. The monovinylidene aromatic monomer may constitute the only component of the polymerizable material or may be in admixture with one or more copolymerizable monomers, such as acrylonitrile; methacrylonitrile; an alkyl methacrylate, e.g., the methyl, ethyl, propyl, and butyl methacrylates; the corresponding alkyl acrylates; alpha-alkylstyrenes, e.g., alpha-methylstyrene, alpha-ethylstyrene, alpha - methyl - p - methylstyrene, etc. Ordinarily, the monovinylidene aromatic monomer constitutes at least 50.0 percent by weight of the polymerizable material.

When desired, the polymerizable material can have a rubbery conjugated 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in concentrations of 1.0 to 25.0 percent, based on the weight of polymerizable material. Also the reaction mixture can contain other optional ingredients, e.g., plasticizers and stabilizers, etc. To minimize possible deleterious effect upon certain catalysts and particularly the preferred organoperoxysilane catalysts, the monomer should be substantially free from residual moisture and is desirably dried.

Catalysts

The present invention is applicable to various types of catalyst systems useful in polymerizing the monomers such as the conventional monomer-soluble peroxy compounds having a half life of 10 to 15,000 hours in benzene at 100° centigrade. Utilizable peroxy compounds include, e.g., hydrogen peroxide, di-tert-butyl diperphthalate, tert-butyl peracetate, tert-butyl perbenzoate, dicumyl peroxide, di-tert-butyl peroxide, tert-butylperoxyisopropyl carbonate, 2,5-dimethyl-2,5-di(tert-butylperoxy)hexane, 2,5-dimethyl-2,5-di(tert-butylperoxy)hexyne-3, tert-butyl hydroperoxide, cumene hydroperoxide, p-menthane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

However, the preferred catalyst systems of the present invention are those utilizing an organoperoxysilane to provide high temperature catalytic activity so as to reduce the residual monomer to a relatively low level. The organoperoxysilanes can be any monomer-soluble organoperoxysilane having a half life of about 220 to 30,000 hours in benzene at 100° centigrade, but the organoperoxysilanes having half lives in benzene of about 500 to 30,000 hours, particularly 8,000 to 28,000 hours, are preferred. Organoperoxysilanes having half lives substantially shorter than about 220 hours in benzene at 100° centigrade are not advantageous in the practice of the invention because they are completely or substantially completely consumed before the reaction reaches the finishing stage, i.e., the stage conducted at 180 to 200° centigrade, then the presence of a catalyst is required in order to reduce residual monomer content. Organoperoxysilanes having half lives longer than about 30,000 hours in benzene at 100° centigrade are at least less efficient and are completely ineffective when they are too stable to decompose at temperatures of 180 to 200° centigrade.

Although trimethylsilylperoxytrimethylsilane and other organoperoxysilanes containing more than one silicon atom and having suitable half lives can be employed, the preferred organoperoxysilanes are compounds corresponding to the formula:

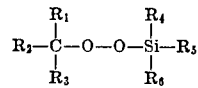

wherein $R_1$, $R_2$ and $R_3$ are independently selected from the group consisting of alkyl, cycloalkyl, aryl and aralkyl radicals and $R_4$, $R_5$ and $R_6$ are independently selected from the group consisting of alkyl, cycloalkyl, aryl and ar-alkyl radicals and a radical corresponding to the formula:

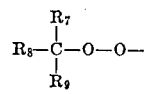

wherein $R_7$, $R_8$ and $R_9$ are independently selected from the group consisting of alkyl, cycloalkyl, aryl and aralkyl radicals. Exemplary of the alkyl, cycloalkyl, aryl and aralkyl radicals which can be present in these compounds are methyl, ethyl, propyl, butyl, pentyl, hexyl, cyclobutyl, cyclopentyl, cyclohexyl, methyl, phenyl, tolyl, naphthyl, benzyl, etc. The preferred compounds are those in which the alkyl and cycloalkyl radicals contain up to 6 carbon atoms and the aryl and aralkyl radicals contain up to 12 carbon atoms.

Such compounds, when not commercially available, can be prepared by reacting a suitable halosilane (e.g., diethyldifluorosilane, ethyltrifluorosilane, tetrafluorosilane, trimethylchlorosilane, triphenylchlorosilane, ditolyldichlorosilane, naphthyltrifluorosilane, dicyclohexyldichlorosilane, benzyltrichlorosilane, ethylisobutylbenzylchlorosilane, etc.) with a suitable organic hydroperoxide or mixture of organic hydroperoxides in the presence of a hydrogen halide acceptor such as ammonia or an amine in a solvent such as ether, etc., essentially in accordance with the equation:

$$SIX_nR_{4-n} + nR'OOH + nNH_3 \rightarrow Si(OOR')_nR_{4-n} + nNH_4X$$

wherein X represents a halogen (i.e. F, Cl, Br, or I), R and R' represent alkyl, cycloalkyl, aryl, or aralkyl radicals, and $n$ is an integer of 1 to 4.

Exemplary of the organoperoxysilanes which can be employed are tert-butylperoxytrimethylsilane,
di(tert-butylperoxy)dimethylsilane,
tri(tert-butylperoxy)methylsilane,
tetra(tert-butylperoxy)silane,
di(tert-butylperoxy)methylphenylsilane,
di(tert-butylperoxy)diphenylsilane,
tri(tert-butylperoxy)phenylsilane,
tert-butylperoxytriethylsilane,
di(tert-butylperoxy)diethylsilane,
tri(tert-butylperoxy)benzylsilane,
tri(tert-butylperoxy)naphthylsilane,
tri(tert-butylperoxy)cyclohexylsilane,
tert-amylperoxytrimethylsilane,
2-phenyl-2-propylperoxytrimethylsilane,
p-menthylperoxytrimethylsilane, etc.,
and mixtures thereof.

The amount of organoperoxysilane employed varies with the particular product desired but is ordinarily in the range of about 0.001 to 0.1 percent, based on the weight of the polymerizable material. The lower concentrations of silane, e.g., about 0.001 to 0.04 percent, are usually employed when a co-catalyst is used; the higher concentrations of silane, e.g., about 0.04 to 0.1 percent are usually employed when no co-catalyst is used.

In many instances, it is desirable to employ the organoperoxysilane in combination with a conventional peroxy catalyst because of the catalytic effectiveness of such peroxy compounds at the temperatures employed prior to the finishing stage of the reaction, i.e., at temperatures of 75 to 180° centigrade. When included as a catalyst component in such a combined catalyst system, the peroxy compound is usually employed in concentrations of 0.01 to 0.1 percent by weight of the monomer, and preferably about 0.01 to 0.05 percent by weight.

Polymerization process

The monomers are initially polymerized in a kettle or reaction vessel over a relatively low temperature range on the order of 125 to 75° centigrade to obtain conversion of the monomer to the extent of about 15 to 45 percent. Thereafter, the partially polymerized mass is heated so as to gradually raise the temperature thereof to about 180 to 200° centigrade over a period of three to seven hours, after which it is finally heated at a temperature of about 180 to 200° centigrade for about one to five hours to complete the polymerization reaction.

In accordance with the preferred aspect of the present invention, the partially polymerized mass is transferred to a platen and frame-type press where the temperature is elevated and the final polymerization conducted. After the polymerization has been completed, coolant is supplied to the press to cool the polymerization product to a temperature of about 30 to 70° centigrade, the platens are removed and the cakes of polymerization product extracted from the frames.

When using a catalyst composition according to the preferred process wherein organoperoxysilanes are included, a fairly specific time-temperature cycle is utilized. In the first state of the reaction, polymerization is conducted at 75 to 125° centigrade for about six to twenty-four hours until 15.0 to 45.0 percent of the monomer has been converted to polymer; in the second stage, the reaction temperature is gradually raised from 75 to 95° centigrade to 180 to 200° centigrade over a period of about three to seven hours; in the final stage, the reaction temperature is maintained at 180 to 200° centigrade for about one-half to five hours.

The manner of manipulating the reaction temperature during the first stage of the reaction in order to be in the 75 to 95° centigrade range for the beginning of the second stage of the reaction is not critical, e.g., an initial temperature of about 100 to 125° centigrade can be gradually lowered to 75 to 95° centigrade during the first stage of the reaction or the temperature can be maintained at 75 to 95° centigrade throughout the first stage of the reaction, etc. According to a preferred embodiment, the reaction mixture is initially heated to 105 to 115° centigrade and the temperature gradually lowered to about 90° centigrade until about 25.0 to 45.0 percent conversion to polymer is obtained, after which the temperature is gradually raised to 180 to 200° centigrade over a period of about three to seven hours and then maintained at 180 to 200° centigrade for about one to five hours to complete the reaction. Especially good results are also obtained by initially heating the reaction mixture at 90° centigrade to about 25 to 35 percent conversion, then heating at a temperature gradually raised to 180 to 200° centigrade over a period of about four to five hours, and finally heating at 180 to 200° centgrade for one to four hours.

The polymer cakes produced by the present invention are found to release readily from the frames of the press and to subsequently exhibit self-lubricating properties in molding operations. The polymer cakes are glossy and free from haze and color. In addition to providing low maintenance upon the polymerization equipment, the more facile operation and utilization of this type polymerization process enhances the economics thereof.

Illustrative of the efficacy of the present invention are the following specific examples in which all parts are parts by weight.

EXAMPLE 1

Part A—Control

In 100 parts of styrene were dissolved 0.04 part of di-tert-butyl peroxide and 0.01 part dimethyl di-(tert-butyl peroxy)silane. The reaction vessel was purged with nitrogen and heated by a fluid at a temperature of about 90 to 95° centigrade for about twenty hours to convert about 30.0 percent of the styrene to polymer. The partially polymerized mass was then gradually raised in temperature by a heating fluid which has its temperature increased from about 90° centigrade to about 180° centigrade over a period of about six and one-half hours in a platen and frame type press. Thereafter, the heating fluid was held at about 180° centigrade for two hours to complete polymerization. The press was then cooled to about 30° centigrade and opened. The platens were separated from the cakes of polymer and the cakes extracted from the frames.

It was noted that the cakes adhered to the platens and to the frames making separation difficult and also that the platens had a white film of polymer remaining thereon after separation requiring cleaning of these surfaces.

The polymer product had a Staudinger average molecular weight of about 65,000 and a residual monomer content of 0.29 percent by weight.

Part B

A product was prepared by substantially repeating Part A and including in the monomer formulation 0.3 part glyceryl monostearate.

It was noted that the polymer cakes produced by this formulation separated readily from the platens and frames which evidenced no residual film of polymer thereon. The cakes had glossy surfaces and the polymer was free from haze and color.

The polymer product had a Staudinger average molecular weight of about 65,400 and a residual monomer content of 0.29 percent by weight.

EXAMPLE 2

In 100 parts of styrene were dissolved 0.04 part of di-tert-butylperoxide, 0.01 part of dimethyl-di-(tert-butyl peroxy)-silane and 0.3 part ethylene glycol monostearate. The reaction vessel was purged with nitrogen and heated by a fluid at a temperature of about 90° centigrade for about twenty hours to convert about 30.0 percent of the styrene to polymer. The partially polymerized mass was then gradually raised in temperature by a heating fluid which had its temperature increased from about 90° centigrade to about 180° centigrade over a period of about six and one-half hours in a platen and frame type press. Thereafter, the heating fluid was held at about 180° centigrade for about two hours to complete polymerization. The press was then cooled to about 30° centigrade and opened. The platens were separated from the cakes of polymer and the cakes extracted from the frames.

It was noted that the polymer cakes produced by this formulation separated from the platens and frames quite easily and the platens and frames evidenced no residual film of polymer thereon. The cakes had glossy surfaces and the polymer was free from haze and color.

The polymer product had a Staudinger average molecular weight of about 66,000 and a residual monomer content of 0.38 percent by weight.

EXAMPLE 3

A series of isothermal polymerization tests were conducted utilizing styrene monomer, 0.04 part di-tert-butyl peroxide catalyst and 0.01 part dimethyl di(tert-butyl peroxy)silane catalyst at a temperature of 90° centigrade for forty-eight hours.

| Monoester | Parts | Conversion, percent |
|---|---|---|
| Control | | 58 |
| Stearic acid | 0.2 | 95 |
| Polyoxyethylene stearate [1] | 0.3 | 60 |
| Glyceryl monostearate | 0.2 | 55 |
| Ethylene glycol monostearate | 0.1 | 58 |
| Sorbitan monostearate [2] | 0.3 | 75 |
| Polyoxyethylene sorbitan monostearate [3] | 0.3 | 85 |

[1] "Myrj 52," Atlas Chemical Co.
[2] SPAN 60, Atlas Chemical Co.
[3] Tween 61, Atlas Chemical Co.

It can be seen that stearic acid has a seriously deleterious effect upon the preferred organoperoxy silane catalyst by causing premature induced decomposition of this high temperature catalyst, thus reducing its effectiveness at high temperature to complete polymerization and minimize residual monomer. The addition of the monoesters results in reduced or little, if any, effect upon the organoperoxysilane catalyst.

EXAMPLE 4

In 100 parts of styrene were dissolved 0.04 part di-tert-butylperoxide and 0.3 part of a sorbitan monoester of stearic acid sold by Atlas Chemical Company under the designation "SPAN 60." A strip of polished stainless steel was inserted into the reaction vessel with a portion thereof projecting outwardly, and the reaction vessel was heated in an oven utilizing a cycle similar to that of Examples 1 and 2 wherein the initial heating step utilized was 90° centigrade for twenty-four hours, the temperature elevation to 180° centigrade being conducted over three and one-half hours, and the temperature finally being held at 180° centigrade for four hours. No organoperoxysilane catalyst was included. The stainless steel strip was readily removed from the polymer and exhibited a shiny surface with only a slight trace of polymer pattern thereon. The polymer itself was free from haze and color.

The foregoing test tends to simulate results obtained in a platen and frame type press and is somewhat more stringent in some respects since the strip is not cooled by a fluid as in the case of the platens of the press so that shrinkage may enhance the separation.

EXAMPLE 5

The test of Example 4 was repeated substituting a proprietary ethylene oxide condensate of sorbitan monostearate sold by Atlas Chemical Company under the designation "Tween 61."

After polymerization, the stainless steel strip was removed readily from the polymer and was shiny and free from polymer pattern. The polymer itself was free from color and haze.

EXAMPLE 6

The test of Example 4 was repeated substituting a polyoxyethylene stearate sold by Atlas Chemical Company under the designation "Myrj 45."

After polymerization, the stainless steel strip was removed from the polymer and was found to be semi-shiny with no trace of polymer pattern thereon. The polymer itself was free from haze and color.

EXAMPLE 7

The test of Example 4 was repeated substituting a polyoxyethylene-propylene monostearate sold by Atlas Chemical Company under the designation "G1262."

After polymerization the stainless steel strip was removed readily from the polymer and exhibited a somewhat dull surface with a slight polymer pattern thereon. However, there was no appreciable sticking in terms of a polymer film. The polymer itself was free from color and haze.

EXAMPLE 8

The test of Example 4 was repeated substituting 0.2 part of a proprietary of polyoxy-glycol monostearate sold by Glyco Corporation under the designation "Pegosperse 300."

After polymerization, the stainless steel strip was removed readily from the polymer and evidenced a semi-shiny finish with a very slight trace of polymer pattern thereon. The polymer itself was free from haze and color.

As will be readily appreciated from the foregoing examples and detailed specification, the present invention provides a novel process for mass polymerizing styrene-type monomers which is particularly advantageously employed in a process wherein a platen and frame type press is utilized. In addition, the process of the present invention is facile and economically advantageous for obtaining a low residual monomer content in the polymer by use of an organoperoxysilane catalyst. Subsequent molding operations utilizing the polymer produced according to the present invention are readily conducted without the necessity for mold lubricants since the polymer itself possesses a satisfactory degree of mold lubricity.

The reaction mixture can contain other optional ingredients, e.g., plasticizers, stabilizers, etc., if so desired. It is obvious that many variations can be made in the processes set forth without departing from the spirit and scope of this invention.

What is claimed is:

1. A mass polymerization process which comprises (1) forming a reaction mixture by dissolving in a polymerizable material comprising at least 50 percent by weight of a monovinylidene aromatic monomer of the group consisting of a monovinylidene aromatic hydrocarbon, an ar-halo monovinylidene aromatic hydrocarbon, and mixtures thereof, a monomer-soluble free radical catalyst and 0.05 to 1.0 percent by weight, based upon the weight of the reaction mixture, of a polyhydric alcohol monoester of an aliphatic monocarboxylic acid corresponding to the following formula:

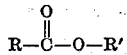

wherein R is an aliphatic group containing eleven to twenty-five carbon atoms and R' is an esterified polyhydric alcohol selected from the group consisting of (A) polyhydric alkyl compounds having two to six carbon atoms, (B) polyalkylene oxide condensates of the formula:

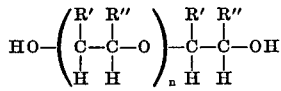

wherein R' and R'' are hydrogen, methyl or ethyl groups and together provide not more than two carbon atoms and $n$ is 4 to 75, and (C) polyalkylene oxide condensates of polyhydric alkyl compounds having two to six carbon atoms wherein the condensate is as set forth in (B) above; (2) subjecting the reaction mixture in a reaction vessel to a heating cycle sufficient to produce polymerization thereof and form a polymerization product; and (3) thereafter separating said polymerization product from said reaction vessel.

2. The process of claim 1 wherein said polyhydric alcohol monoester of an acid is an ester formed by a polyhydric alcohol of 2 to 4 carbon atoms and a monocarboxylic acid of 14 to 20 carbon atoms.

3. The process of claim 1 wherein the catalyst includes an organoperoxysilane having a half life of about 220 to 30,000 hours in benzene at 100° centigrade.

4. The process of claim 1 wherein said heating cycle includes initial polymerization at a temperature of about 75 to 125° centigrade to a conversion on the order of about 15.0 to 45.0 percent, gradual elevation in temperature to about 180 to 200° centigrade over a period of three to seven hours and maintenance at a temperature of about 180 to 200° centigrade for about one to five hours to complete the polymerization reaction.

5. The process of claim 4 wherein said steps of gradual elevation of temperature to about 180 to 200° centigrade and maintenance at about 180 to 200° centigrade are conducted in a platen and frame type press providing the reaction vessel and wherein the press is cooled after polymerization has been completed and the platens and frames are thereafter separated from the polymerization product.

6. The process of claim 4 wherein said catalyst includes an organoperoxysilane having a half life of about 220 to 30,000 hours in benzene at 100° centigrade.

7. The process of claim 3 wherein the organoperoxysilane is a compound corresponding to the formula:

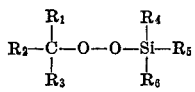

wherein $R_1$, $R_2$ and $R_3$ are independently selected from the group consisting of alkyl, cycloalkyl, aryl and aralkyl radicals and $R_4$, $R_5$ and $R_6$ are independently selected from the group consisting of alkyl, cycloalkyl, aryl, and aralkyl radicals and a radical corresponding to the formula

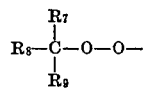

wherein $R_7$, $R_8$ and $R_9$ are independently selected from the group consisting of alkyl, cycloalkyl, aryl and aralkyl radicals.

8. The process of claim 1 wherein the polymerizable material is styrene.

9. The process of claim 1 wherein the polymerizable material is styrene-acrylonitrile.

10. The process of claim 1 wherein the polymerizable material contains a dissolved rubbery conjugated 1,3-diene polymer.

11. A mass polymerization process which comprises (1) forming a reaction mixture by dissolving in a polymerizable material comprising at least 50 percent by weight of a monovinylidene aromatic monomer of the group consisting of a monovinylidene aromatic hydrocarbon, an ar-halo monovinylidene aromatic hydrocarbon, and mixtures thereof, a monomer-soluble free radical catalyst including an organoperoxysilane corresponding to the formula:

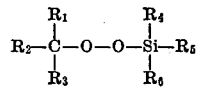

wherein $R_1$, $R_2$ and $R_3$ are independently selected from the group consisting of alkyl, cycloalkyl, aryl and aralkyl radicals and $R_4$, $R_5$ and $R_6$ are independently selected from the group consisting of alkyl, cycloalkyl, aryl and aralkyl radicals and a radical corresponding to the formula:

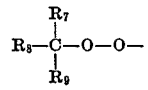

wherein $R_7$, $R_8$ and $R_9$ are independently selected from the group consisting of alkyl, cycloalkyl, aryl and aralkyl radicals and 0.05 to 1.0 percent by weight, based upon the weight of the reaction mixture, of a polyhydric alcohol monoester of an aliphatic monocarboxylic acid corresponding to the following formula:

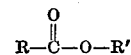

wherein R is an aliphatic group containing eleven to twenty-five carbon atoms and R' is an esterified polyhydric alcohol selected from the group consisting of (A) polyhydric alkyl compounds having two to six carbon atoms, (B) polyalkylene oxide condensates of the formula:

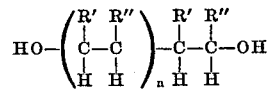

wherein R' and R'' are hydrogen, methyl or ethyl groups and together provide not more than two carbon atoms and $n$ is 4 to 75, and (C) polyalkylene oxide condensates of polyhydric alkyl compounds having two to six carbon atoms wherein the condensate is as set forth in (B) above; (2) heating the reaction mixture at about 75 to 125° centigrade to effect conversion of about 15.0 to 45.0 percent of the polymerizable material; (3) transferring the partially converted reaction mixture to a platen and frame type press; (4) heating said reaction mixture in the platen and frame type press with a fluid having a temperature gradually raised to about 180 to 200° centigrade over a period of about three to seven hours; (5) heating the said reaction mixture in the press with a fluid having a temperature of about 180 to 200° centigrade for a period of about one to five hours to complete the polymerization reaction and form a polymerization product; (6) cooling the platen and frame press and polymerization product; and (7) thereafter separating the platens and frames from said polymerization product.

12. The process of claim 11 wherein said polyhydric alcohol monoester of an acid is an ester formed by a polyhydric alcohol of 2 to 4 carbon atoms and a monocarboxylic acid of 14 to 20 carbon atoms.

13. The process of claim 11 wherein said organoperoxysilane is di-(tert-butylperoxy)dimethylsilane.

References Cited

UNITED STATES PATENTS

| 3,288,772 | 11/1966 | Becker et al. | 260—85.5 |
| 3,297,669 | 1/1967 | Harris et al. | 260—880 |

JOSEPH L. SCHOFER, *Primary Examiner.*

H. WONG, *Assistant Examiner.*

Washington, D.C. 20231

UNITED STATES PATENT OFFICE
CERTIFICATE OF CORRECTION

Patent No. 3,407,246            October 22, 1968

Alva F. Harris

It is certified that error appears in the above identified patent and that said Letters Patent are hereby corrected as shown below:

Column 2, line 14, "a halo" should read -- ar-halo --; line 16, after "admixture," insert -- of a polyhydric alcohol monoester of an aliphatic mono- --. Column 8, line 36, "G1262" should read -- G2162 --.

Signed and sealed this 3rd day of March 1970.

(SEAL)
Attest:

Edward M. Fletcher, Jr.            WILLIAM E. SCHUYLER, JR.
Attesting Officer            Commissioner of Patents